United States Patent
Bélanger-Barrette et al.

(10) Patent No.: US 12,330,290 B1
(45) Date of Patent: Jun. 17, 2025

(54) OPERATOR-FRIENDLY INTERFACE FOR COLLABORATIVE ROBOTS

(71) Applicant: ROBOTIQ INC., St-Nicolas (CA)

(72) Inventors: Mathieu Bélanger-Barrette, St-Ferréol-les-neiges (CA); Sylvain Gagné, Sainte-Catherine-de-la-Jacques-Cartier (CA); Samuel Fradette, Beaumont (CA); Renaud Sanfaçon, Québec (CA); Mathieu Ouellet, Saint-Augustin-de-Desmaures (CA); Michaël Vallée, Lévis (CA); Étienne Samson, Québec (CA)

( * ) Notice: Subject to any disclaimer, the term of this patent is extended or adjusted under 35 U.S.C. 154(b) by 278 days.

(21) Appl. No.: 18/324,243

(22) Filed: May 26, 2023

Related U.S. Application Data

(60) Provisional application No. 63/347,372, filed on May 31, 2022.

(51) Int. Cl.
*B25J 13/04* (2006.01)
*B25J 13/06* (2006.01)
*B25J 19/02* (2006.01)

(52) U.S. Cl.
CPC .............. *B25J 13/06* (2013.01); *B25J 13/04* (2013.01); *B25J 19/023* (2013.01)

(58) Field of Classification Search
CPC ...... B25J 13/006; B25J 19/066; B25J 9/1676; B25J 9/1694; B25J 13/06; B25J 13/04; B25J 19/023; G06F 3/167; G05B 2219/40202; G05B 2219/39001
See application file for complete search history.

(56) References Cited

U.S. PATENT DOCUMENTS

| | | | |
|---|---|---|---|
| 7,270,442 B2 | 9/2007 | Davenport et al. | |
| 9,922,478 B1 | 3/2018 | Wong | |
| 10,303,495 B2 | 5/2019 | Nishi et al. | |
| 10,875,187 B2 | 12/2020 | Paquin et al. | |
| 11,931,118 B1 * | 3/2024 | Roh | A61B 34/25 |
| 2003/0030638 A1 | 2/2003 | Astrom et al. | |
| 2016/0093180 A1 | 3/2016 | Fitzgibbon et al. | |
| 2019/0000569 A1 * | 1/2019 | Crawford | A61B 34/20 |
| 2022/0011754 A1 | 1/2022 | Sagasaki et al. | |

(Continued)

OTHER PUBLICATIONS

Kamezaki et al., Development of a Dual Robotic Arm System to Evaluate Intelligent System for Advanced Construction Machinery, 2010, IEEE, p. 12-1304 (Year: 2010).*

(Continued)

*Primary Examiner* — McDieunel Marc
(74) *Attorney, Agent, or Firm* — Anglehart et al.

(57) ABSTRACT

A robotic module or interface allows a cobot to non-intrusively operate a piece machinery, to monitor an optical output of the machinery and/or to monitor an operator's action while ensuring that the operator can still operate the machinery. The design of the piece of machinery may not be intended for use other than by an operator. The cobot module or interface that allows the cobot and an operator to simultaneously, sequentially and/or alternately interact with a piece of machinery. The module or interface further allows the cobot to monitor the operator interaction with the piece of machinery and/or an optical signaling of the machinery generally intended for the operator.

17 Claims, 12 Drawing Sheets

(56) References Cited

U.S. PATENT DOCUMENTS

2022/0057884 A1    2/2022  Lin
2023/0325002 A1*  10/2023  Bicking ................ G06F 3/017
                                                        715/863

OTHER PUBLICATIONS

Sasaki et al., Development of remote control system of construction machinery using pneumatic robot arm, 2004, IEEE, p. 748-753 (Year: 2004).*

Tanzini et al., Embedded Architecture of a Hydraulic Demolition Machine for Robotic Teleoperation in the Construction Sector, 2018, IEEE, p. 506-513 (Year: 2018).*

Kamezaki et al., Development of operator support system with primitive static states for intelligent construction machinery, 2009, IEEE, p. 1-6 (Year: 2009).*

* cited by examiner

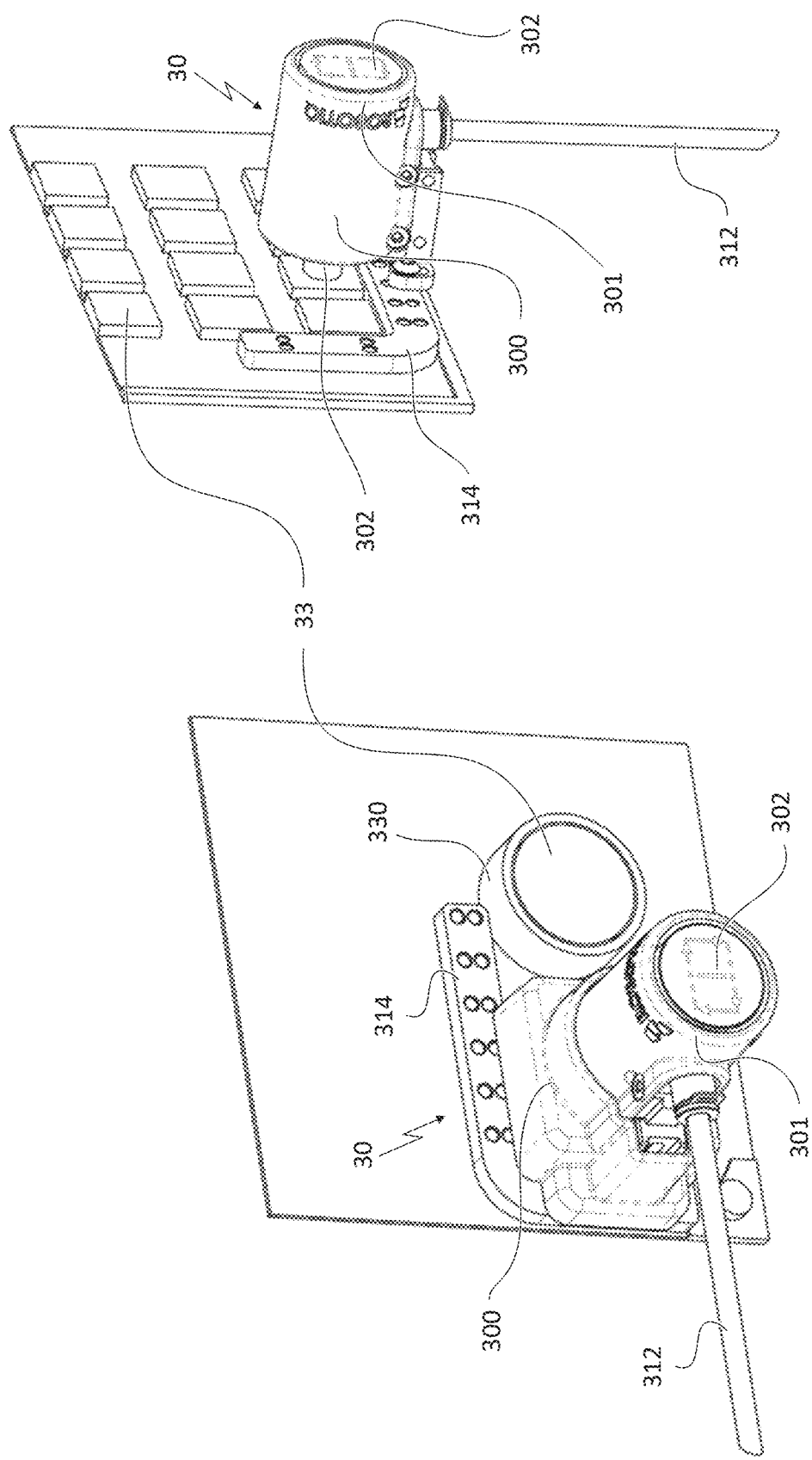

OPERATOR-FRIENDLY INTERFACE FOR COLLABORATIVE ROBOTS

CROSS-REFERENCES TO OTHER RELATED PATENT APPLICATIONS

This application claims priority from U.S. provisional patent application 63/347,372 filed May 31, 2022, the content of which is hereby incorporated by reference.

TECHNICAL FIELD

The present patent application relates to the field of collaborating robots and more specifically to their interface with distinct machinery.

BACKGROUND

Collaborative robots or cobots as it is known in the field are a developing field and have a rapidly growing market. Cobots can be used to replace the operator of a CNC machine and can use machine vision to recognize source material blocks or unfinished parts in a tray or rack, pick them up and place them in the CNC machine for processing (e.g., cutting/machining). When the part is finished in the CNC machine, the robot removes the part and places in a tray or rack of finished parts. Typically, people are used to collect trays of finished parts and replenish trays of unprocessed parts or blocks.

The cobot can be interfaced with the CNC's control software to control its various control inputs or to know when it is finished and when there is a failure, however, such interfacing is complicated, often significantly intrusive and can potentially lead to loss of warranty, life span or various complications. In the current state of the art, the interface of cobots generally does not allow for a unintrusive connection with the associated machinery. In the rare cases where the cobot is using non-intrusively the input or output interface of an associated machinery, the cobot may not allow an operator to keep using the input or output when it is connected or used by the cobot. The prior art does not present any cobot module or interface unit that simultaneously allows the cobot to interact with a part of the machinery's interface, the operator to interact with the same interface part, the cobot to detect if the operator interacts with the same interface part.

SUMMARY

Applicant discloses herein a robotic interface of a robot or cobot for non-intrusively operating a mechanical input of a machinery or for monitoring an optical output of the machinery or to monitor an interaction between an operator and a machinery or a combination thereof, while ensuring that the operator can still operate the machinery.

Applicant proposed a robotic interface for non-intrusively operating a machinery having an input requiring mechanical contact comprises an actuator for physically engaging said input of said machinery; a control input for controlling said actuator; and an operator-input operable by an operator for operating said input of said machinery. In some embodiments, the operator-input controls the actuator. In some embodiments, the input of the machinery and the operator-input are at least one control pedal. In some embodiments, the input of the machinery and the operator-input are at least one push-button. In some embodiments, the operator-input further comprises a tamper-proof component to prevent its unintentional use. In some embodiments, the operator input-actuator of the machinery further comprises a tamper-proof bypass to bypass a tamper-proof feature of the input of the machinery. In some embodiments, the operator input-actuator of the machinery further comprises a tamper-proof disabling component to disable the tamper-proof feature of the input of the machinery. In some embodiments, the robotic interface further comprises a supporting frame for coupling with the machinery. In some embodiments, the control input uses a pressurized fluid for mechanically activating the actuator. In some embodiments, the pressurized fluid is a pressurized gas that controls a pneumatic cylinder to move the actuator. In some embodiments, the pressurized fluid is a pressurized liquid that controls a hydraulic cylinder to move the actuator. In some embodiments, the robotic interface further comprises a control unit connected to and for controlling at least one control input. In some embodiments, the control unit is connected to a control input of at least another of the robotic interface. In some embodiments, the control unit is remotely controlled. In some embodiments, the control unit is controlled by a robot. In some embodiments, the robotic interface further comprises a detector for detecting an interaction between the operator and the operator-input. In some embodiments, the detector is connected to an output of the robotic interface for signaling the interaction to a robot. In some embodiments, the detecting comprises, generating data comprising details about the interaction and transmitting the data to a robot through the output. In some embodiments, the robotic interface for non-intrusively operating a machinery having an input requiring mechanical contact is used by a robot or cobot.

Applicant also proposes a robotic interface for non-intrusively detecting a visual output of a visual-output-indicator of a machinery intended for an operator comprising: an optical detector for measuring the visual output and for converting the measured visual output into an electronic optical data; and an output of the robotic interface for transmitting the optical data to a robot, wherein the robotic interface is positioned around the visual-output-indicator so as to allow the operator to observe the visual output of the visual-output-indicator. In some embodiments, the optical detector is a photodetector. In some embodiments, the visual-output-indicator is a light indicator. In some embodiments, the light indicator is a signal tower stack light. In some embodiments, the robotic interface further comprises a housing of robotic interface for coupling to the visual-output-indicator, wherein the housing allows for the measuring of the visual output. In some embodiments, one face of the housing allows for the measuring of the visual output and is shaped to match a shape of the visual-output-indicator for improving the coupling to the visual-output-indicator and reducing optical interference. In some embodiments, the optical detector is an image sensor (e.g., a camera). In some embodiments, the visual-output-indicator is a display screen. In some embodiments, the optical detector further detects an interaction between the operator and the machinery, wherein details of the interaction is comprised in the electronic optical data. In some embodiments, the output of the robotic interface is connected to an input of a control unit. In some embodiments, the control unit is remotely controlled. In some embodiments, the control unit is connected to at least one other of such a robotic interface. In some embodiments, the output of the robotic interface is connected to an input of a relay unit, wherein the relay unit remotely does the transmitting to a robot. In some embodiments, the control unit comprises the relay unit. In some embodiments, the robotic interface for non-intrusively detecting a visual output of a visual-output-indicator of a machinery is used by a robot or cobot.

A robot or cobot can use at least one of the robotic interface for non-intrusively operating a machinery having an input requiring mechanical contact and at least one of the robotic interface for non-intrusively detecting a visual output of a visual-output-indicator of a machinery.

BRIEF DESCRIPTION OF THE DRAWINGS

The invention will be better understood by way of the following detailed description of embodiments of the invention with reference to the appended drawings, in which:

FIG. 3A is a general view of an embodiment of the button actuator unit.

FIG. 3B is a general view of an alternative embodiment of the button actuator unit.

DETAILED DESCRIPTION

Figure 1A:
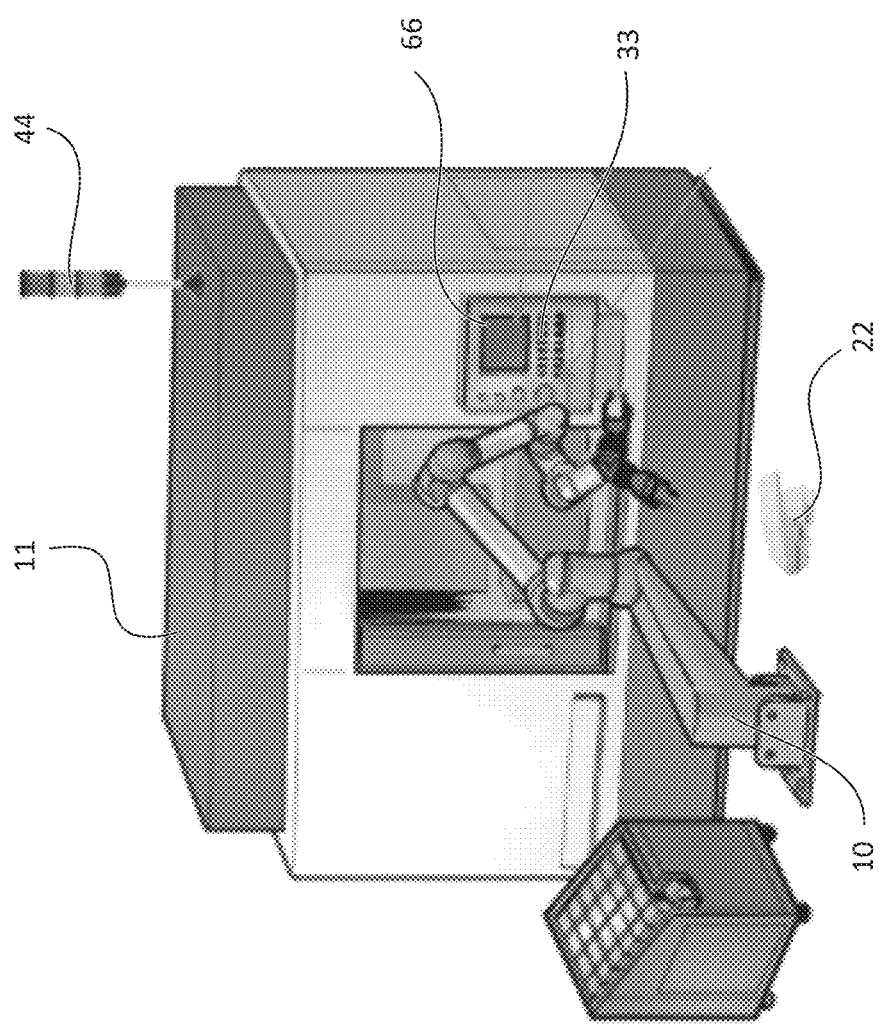
FIG. 1A is an illustration of a collaborating robot system for operating machinery.

In the present disclosure, a collaborative robot or "cobot" refers to the hardware, equipment or any robot configured to operate in combination with another piece of equipment. The other piece of equipment can be any piece of hardware, machinery (e.g., industrial machine, CNC machine, assembly line machine or robot, etc.) or robots that may need an external input (e.g., directive, instruction, mechanical input, etc.) or any external complementary action (e.g., moving pieces such as a molded piece to feed or place in a machine and to reposition or remove) at one point in its process.

The present disclosure includes a description of various robotic modules or interfaces that can allow a robot or cobot to non-intrusively operate a piece machinery (e.g., machinery's interface), to monitor an optical output of the machinery and/or to monitor an operator's action while ensuring that the operator can still operate the machinery. In some embodiments, the original design of the piece of machinery may not be intended for use other than by an operator and may not allow the use by a robot. The cobot module or interface can allow a cobot and an operator to simultaneously, sequentially and/or alternately interact with a piece of machinery. The module or interface can further allow the cobot to monitor the operator interaction with the piece of machinery and/or an optical signaling of the machinery generally intended for the operator.

Applicant as developed various non-intrusive cobot modules and interface units that can allow the cobot to interact with a part of the machinery's interface. The machine interface can comprise any type of input control requiring mechanical contact (mechanical input) that can be used to control the machine, a visual-output-indicator for communicating information to an operator, or a combination thereof. In the present disclosure, an input requiring a mechanical contact can be understood to mean any type of physical contact with a part of a machinery or machine that can measure, detect inputs. A physical contact can induce physical force including pushing, pulling, stroking, slapping, pinching, rubbing, scratching, squishing, or others. In the present disclosure, a visual-output-indicator of a machinery can be any type of output (e.g., visual indicator, light indicator, visual display, etc.) that generates or transmit a light signal containing information. The information contained in a light signal or visual signal can be such that it can be detected by an operator and can therefore be limited to certain thresholds (e.g., flashing frequency, wavelength, color, intensity, etc.) in accordance with the visual limitations of the human eye.

When the machine comprises an input requiring mechanical contact, some embodiments of the proposed cobot interface can allow the cobot to interact with the mechanical input machinery's interface and allow the operator to interact with the same mechanical input. In some embodiments, the modules and interface units can simultaneously allow the cobot to interact with a part of the machinery's interface and the operator to interact with the this cobot interface to control the mechanical interface. It will be appreciated that the cobot interface can comprise an operator-input that can be controlled (e.g., mechanically controlled) by an operator, which can then indirectly (e.g., by controlling an actuator of the cobot interface) or directly (e.g., by bypassing the actuator of the cobot interface) control the mechanical input of the machinery. In some embodiments, the cobot interface can further detect an operator mechanical interaction or mechanical contact with the mechanical input of the machinery whether it bypasses the actuator of cobot interface or not. In some embodiments, the cobot interface can detect a characteristic of this mechanical contact (e.g., speed, strength, frequency, etc.).

The cobot can be interfaced in various manners with a wide variety of other pieces of equipment. In the prior, the other piece of equipment may not be properly equipped to connect or interact with the cobot and requires the cobot to be interfaced with it by intrusive means. An intrusive mean may be a modification or an interaction not allowed by the original design of the other piece of equipment, which may include a modification not supported by the equipment's manufacturer, which can include software modification or a physical modification such as opening the housing, removing of a part, lifting of a control panel or hardware interaction or other type of tampering of the original machinery. An intrusive mean can also comprise any tampering with any of the electronic components including adding a connection, hijacking of an electronic signal or more. An intrusive mean can also include any modifications that may lead to loss of the equipment's warranty coverage.

FIG. 1A shows an exemplary setup of a collaborative robot 10 (e.g., mechanical arm) that is conventionally used to feed, load or unload the machine 11. The machine 11 of FIG. 1A comprises various pieces of machinery and interfaces (a pedal input-interface 22, a control interface with push-button 33, a light indicator interface 44 and a display-interface 660). The robot interfaces proposed herein can allow the cobot to un-intrusively use and control these various machine interfaces.

Figure 1B:
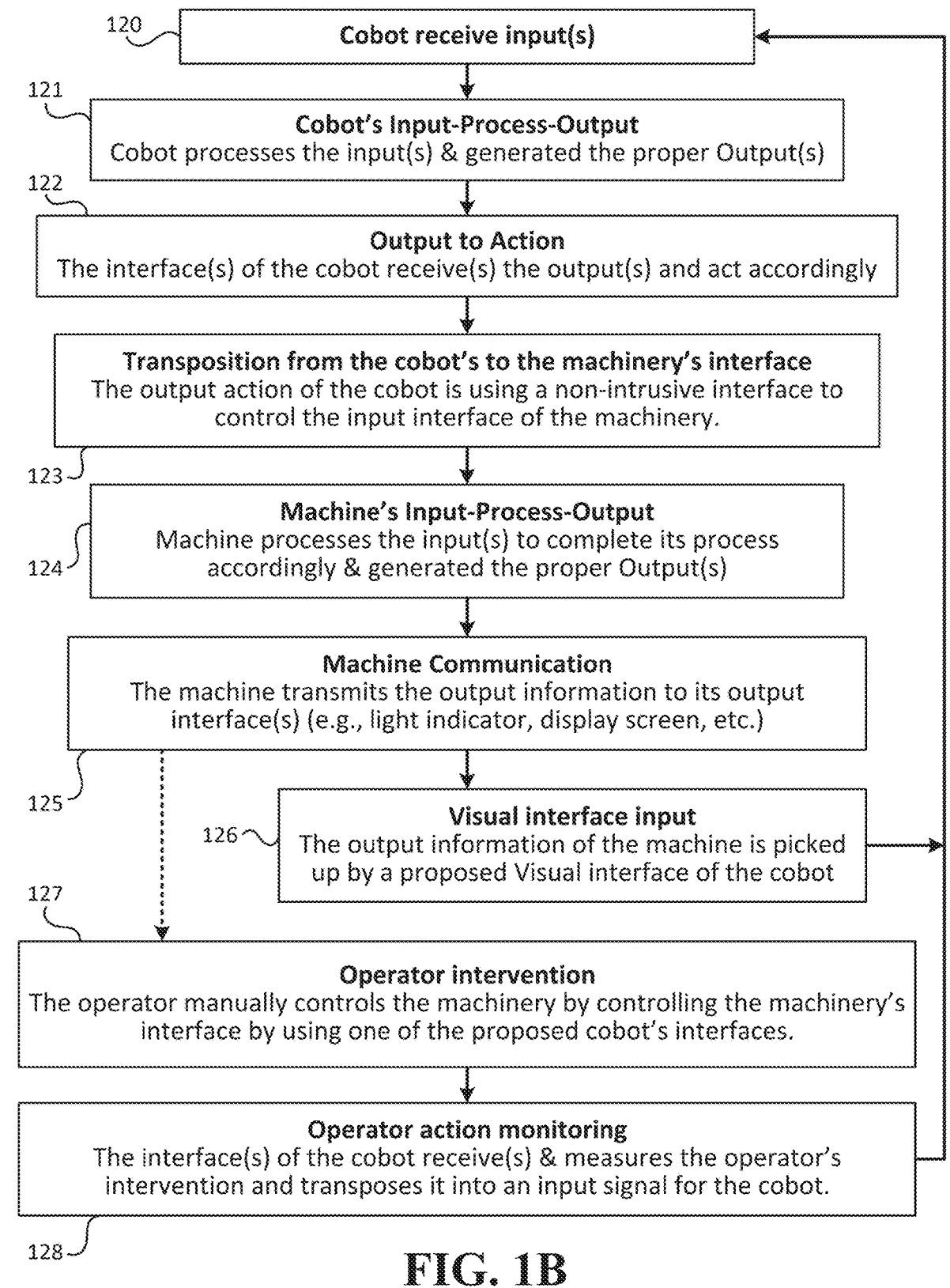
FIG. 1B is a block diagram of the possible interactions between a cobot and some machinery via their respective interfaces.

FIG. 1B presents a block diagram of an embodiment of possible steps that a cobot may take in order to operate and to control its associated machine 11. It will be appreciated that this block diagram focuses on the processing of various data associated with the controlling and operating of a machine by showing the relationship between the various inputs and outputs of both the cobot and the machine respective interfaces. It will be appreciated by someone skill in the art that additional steps or intermediate steps may be added as required to the presented embodiment of FIG. 1B. Note that the proposed robot interfaces and various hardware and/or software maybe required or utilized in order to achieve the presented steps. It will be further appreciated by someone skilled in the art that the presented steps may comprise an innovative method of operating a machine with a collaborative robot such that the proposed robot interfaces are used to improve the efficiency of the cobot, since it can allow the cobot to use or consider additional input from the machine and/or the operator.

In step 120, a collaborative robot can receive an input that can be instructions or updates about the status of the machine's process. In step 121, the input can be processed by the cobot's decisional unit (e.g., software program) to accordingly generate a proper output signal, which can comprise various information that can be instructions for the cobot interface, for example. In some embodiments, this output signal may be directly or indirectly used to generate a mechanical signal (e.g., fluid pressure, fluid flow, etc.). In step 122, the instructions or mechanical signal of the output signal can be received and used by at least one of the proposed operating non-intrusive robotic interfaces which are the interfaces that can enable the cobot to operate at least one of the interfaces (e.g., pedal actuator unit, push-button actuator unit, etc.). Upon receiving the signal, the operating one intrusive robotic interface converts this signal into a mechanical motion can engage the actuator of these interfaces. In step 123, the mechanical motion of the activator of the robot interface can interact with the mechanical input interface of the machine (e.g., pedal input-actuator, push-button input actuator, etc.), referred to herein as the mechanical input of the machine. This last interaction can allow the robot to engage the mechanical input of the machine and therefore transpose the robot interface output into the machine interface input. In step 124, the input information acquired by the machine interface can be processed so that the machine can act accordingly, meaning that it can complete the appropriate process. In some embodiment's, the machine may be configured to output various visual information before, during or after the required process. In those instances, step 125 can be part of the process, since the machine may utilize one or more output interfaces (e.g., light indicator, display, etc.) to communicate various information that would normally be intended for an operator of the machine. In step 126, the cobot may use one of the proposed visual input interfaces accordingly to the machine's visual output interface. For example, when the machine uses a light indicator to communicate visual information the cobalt may use a light detector device an appropriate interface for acquiring this optical data to communicate it or be interpreted by the cobot which can process it as an input data (e.g., step 120). Optionally, this input data may include the operator's mechanical interaction with the machine's input-interface, which may result from its monitoring (step 128). It will be appreciated that the operator's intervention (i.e., interaction with the machine) of step 127, which may be completed via one of the proposed robot interfaces, may be prompted by or be done in reaction to the machine's visual output that the operator might have picked up.

Figure 1C:
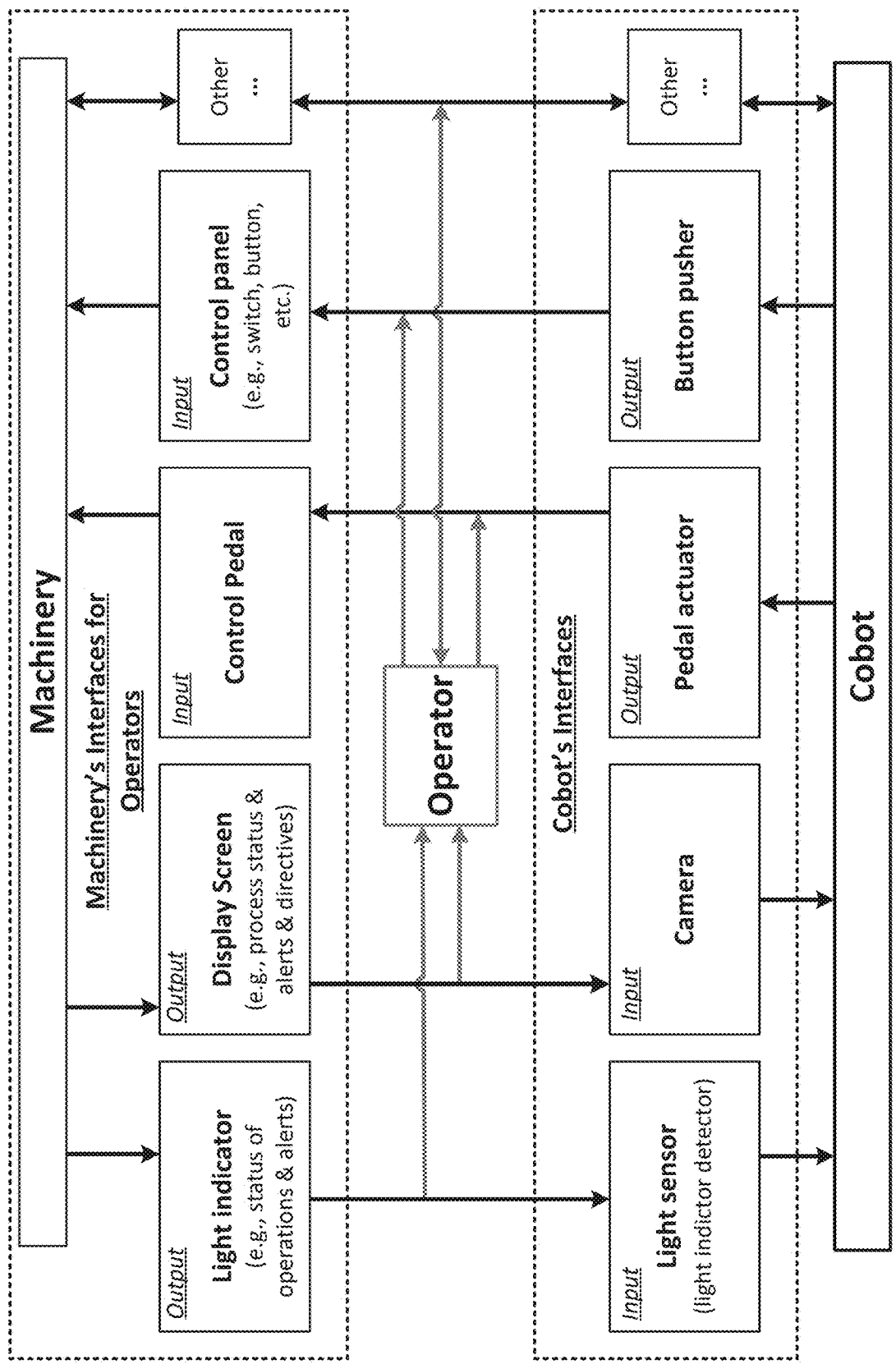
FIG. 1C is a schematic representation of possible interactions between a cobot, some machinery and, optionally, an operator via their respective interfaces.

FIG. 1C is a schematic representation of possible interactions between a cobot, some machinery and, optionally, an operator via their respective interfaces. The arrows may indicate the direction of the information during the various interactions. It will be appreciated that the output interfaces of the cobot can also act as an input in the embodiments where the proposed robot interfaces further comprise a detector for monitoring the operator interaction.

In some embodiments the robot interface can be an operating non-intrusive robotic interface, comprising an actuator that can be controlled by means of a component that can convert an input signal (e.g., electrical, fluid pressure, fluid flow, etc.) into mechanical motion, referred to herein as a mechanical motion generator. A mechanical motion generator can be, but is not limited to, a cylinder (e.g., hydraulic, pneumatic or mechatronic) or electromechanical actuator or other type of motors. It will be appreciated that a mechanical motion generator can be used to control or simply induce the motion of an actuator which can allow it to physically operate an input control or an input interface of a machinery or machine.

It will be appreciated that some embodiments of a mechanical control interface can be equipped with a detector for detecting when an operator interact with an operator-input of the interface. A detector can be integrated to or combined with any of the moving parts of the pedal actuator unit. The level of monitoring of such a detector can vary in accordance with the need of the associated robot or cobot. In other words, the detector can be selected or adjusted to collect more than a binary information (e.g., in use vs not in use), meaning that it may detect, measure or monitor various aspects of the operator's action (e.g., interaction between the operator and the operator-input of the interface), such as information about the amplitude of the action, the speed to the action or more. In some embodiments, the information collected by the detector can be used by the associated robot or cobot as an addition or complementary input date to determine the state of the machine's process, the best next operation to perform, to complement a machine-learning software and other data process that can improve its efficiency.

In some embodiments the robot interface can be a visual input interface that can be used for converting light and visual information/cues output from a visual output (e.g., stack light or display) of an industrial machine into an electronic/informatic input for an automated or collaborative robot intended to operate the industrial machine while a human operator can still be able to see and accurately interpret said visual cue, meaning that said apparatus may not significantly obstruct the view of a human operator.

The following sections presenting exemplary embodiments of various types of cobot interfaces are not intended to be limiting the possible embodiments of the proposed non-intrusive cobot interfaces.

Pedal Actuator Unit

Figure 2A:
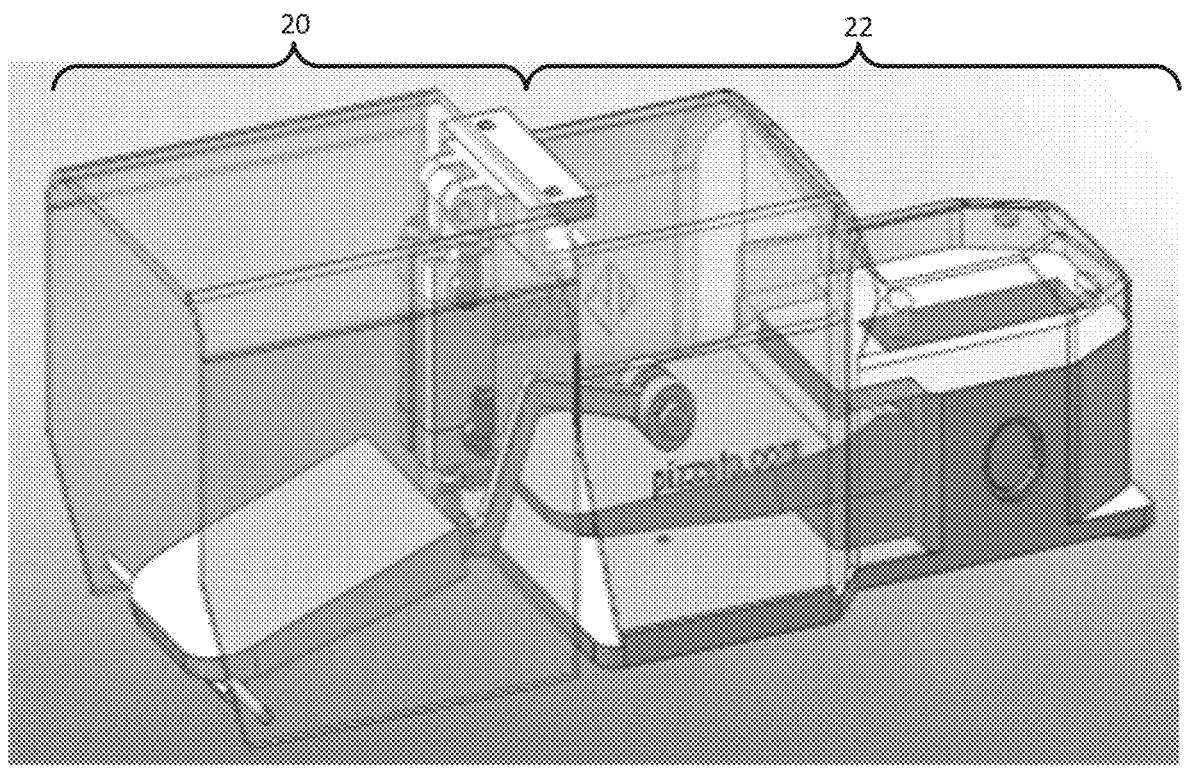
FIG. 2A is a general view of a 3D modelization of an embodiment of a pedal actuator unit.

Some machinery can be equipped with one or more types of mechanical inputs, which in some cases are a pedal or a treadle of the machinery for controlling some aspect of the machinery's process. In such cases, a robot or cobot can utilize a proposed modular non-intrusive pedal actuator unit 20 as an appropriate robot interface to operate the pedal input of the machinery 22, as illustrated in FIGS. 2A, 2B and 2C.

The problem to be solved with the proposed pedal actuator unit 20 may comprise physically pushing a pedal or a treadle of an industrial machine 22 while allowing an operator to physically operating the same pedal while the robot interface is still fixed over the pedal (i.e., non-intrusively coupled to the corresponding machine interface). The pedal actuator unit can control an actuator to physically operate the mechanical input of the machinery. In some embodiments, the operator operates the operator-input of the proposed pedal actuator unit to directly operates the mechanical input of the machinery or to operate it indirectly by controlling the actuator of the pedal actuator unit, which in turn directly operates the mechanical input of the machinery.

This invention was developed to facilitate and allow the integration of automated robots used to replace or use in combination with the operator(s) of the industrial machine(s) having a physical interface comprising at least one pedal used to operate it. The industrial machines considered herein can have various integrated pedals. An "integrated pedal" can be a physical interface to activate or control a system or process or operation of a machinery or machine, which may take the form of a mechanical input (e.g., a pedal or treadle). The Pedal Actuator may be activated with various control systems (e.g., pressurized fluid systems). In some embodiments, the Pedal Actuator is designed to overcome various tamper-proof features of pedals of the machinery (e.g., lock mechanism). In some embodiments, the operator-input of the pedal actuator unit can be equipped with tamper-proof features (e.g., lock mechanism) that can efficiently prevent an operator to accidentally or involuntarily activate the operator-input of the pedal actuator. In some embodiments, the operator can deactivate the tamper-proof lock of activate the operator-input of the pedal actuator unit before or while using it and in some cases can do so with the same body part, preferably his foot.

Figure 2B:
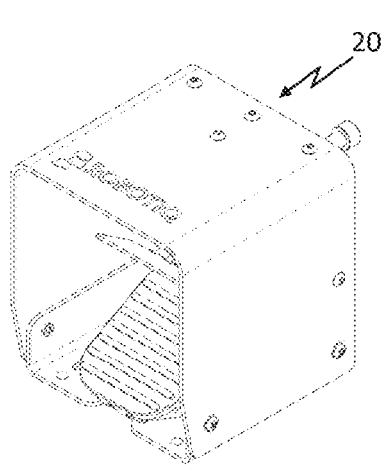
FIG. 2B is a general view of the pedal actuator unit.
Figure 2C:
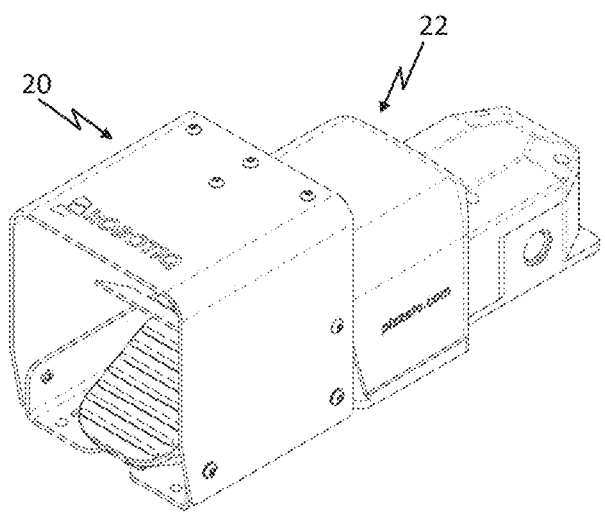
FIG. 2C is a general view of the pedal actuator unit coupled to a pedal control panel.

FIG. 2B presents an embodiment of a modular non-intrusive pedal actuator unit 20. FIGS. 2A and 2C present the pedal actuator unit 20 in combination with and coupled to a mechanical input of the machinery 22 (i.e., a pedal input-actuator). FIGS. 2F and 2G show alternative embodiments of the pedal actuator unit 20 in combination with a pedal input-actuator 22.

Figure 2D:
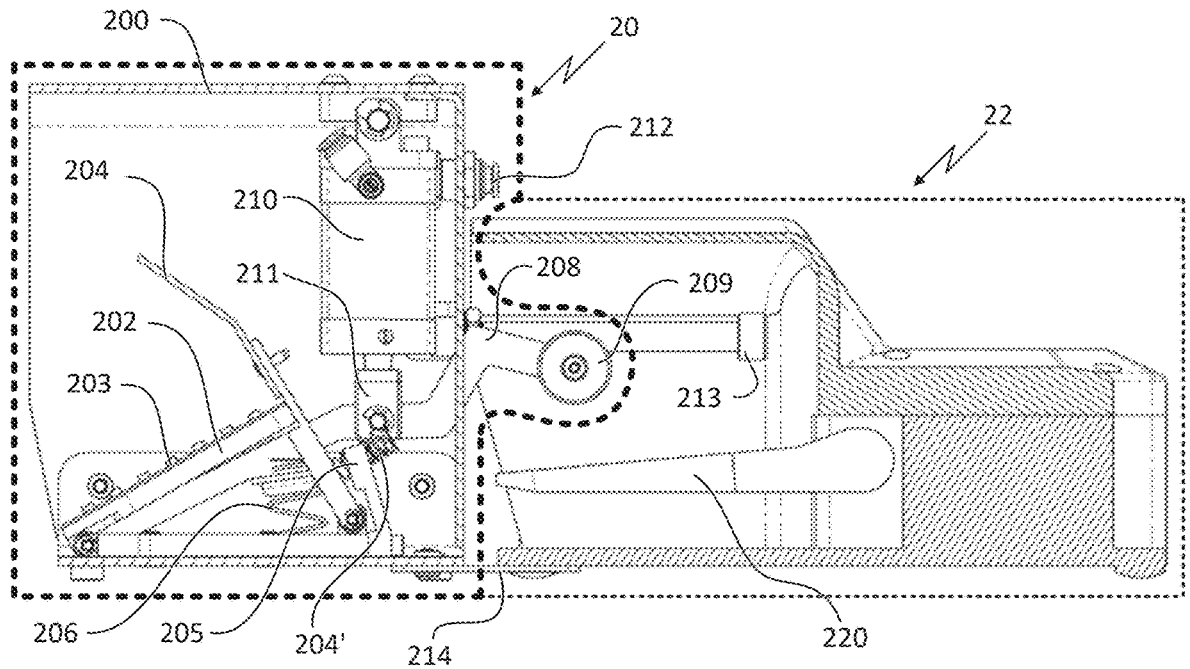
FIG. 2D is a cross-section side view of a technical drawing of an embodiment of the pedal actuator unit coupled to a pedal control panel.

FIG. 2D presents a cross-section side view of a technical drawing of an embodiment of the pedal actuator unit 20 coupled to a pedal control panel 22. The pedal actuator unit 20 can use an actuator 208 to engage a mechanical actuator 220 (e.g., pedal or treadle) of pedal control panel 22. The pedal actuator unit 20 can be equipped with various types of actuators 208, that can be an actuating arm or lever as illustrated in this embodiment, that can be coupled to a moving part (e.g., a moving piston 211) of a mechanical motion generator 210. The motion generator component can be one or more hydraulic, pneumatic or mechatronic cylinder(s) or alternatively various types of motors. The mechanical motion generator 210 can be used to convert an input signal (e.g., electrical, fluid pressure, fluid flow, etc.) going through a control signal input 212 input mechanical motion that can result in the motion of a piston 211 which controls the position and motion of an actuator 208, for example. The actuator 208 can be equipped or coupled with a restoring or resetting mechanism 206 that can provide a mechanical resistive and restoring force sufficient enough to move the actuator 208 back to an initial position (i.e., a position that does not engage the mechanical actuator 220 of pedal control panel 22). The pedal actuator unit can also comprise an operator-input 202 (e.g., the operator's pedal) to allow the operator to, directly or indirectly, engage the mechanical input of the machinery 220 (e.g., the machine's pedal). In some embodiments, the pedal actuator unit may comprise a tamper-proof component for the mechanical input of the machinery, which can be a mechanical, electrical or magneto-electric lock or blocker or stopper that can prevent the mechanical input of the machinery to be moved, operated or engaged involuntarily. In the exemplary embodiment of FIG. 2D, the tamper-proof component may be a mechanical blocker, that can comprise a tamper-proof lever 204 that can be pushed against the pedal 202, with a spring 204' for example, and can be pushed against a lever blocker 205 by the operator to be disengaged and allow him to use the pedal 202. In some embodiments, the operator's pedal of the pedal actuator unit can have a textured surface 203 to improve the contact and adherence of the operator's foot or footwear. The pedal actuator unit can comprise a housing 200 equipped with a coupler 214 for non-intrusive coupling with the pedal input-actuator 22 of the machinery, preferably with its housing. The pedal actuator unit can comprise a component for disengaging, deactivating or bypassing any tamper-proof mechanism of the pedal input-actuator 22 of the machinery. In the embodiment presented in FIG. 2D, a fixed shaft 312 can be used to pushback any tamper-proof lever or mechanism of pedal input-actuator 22 of the machinery.

Figure 2E:
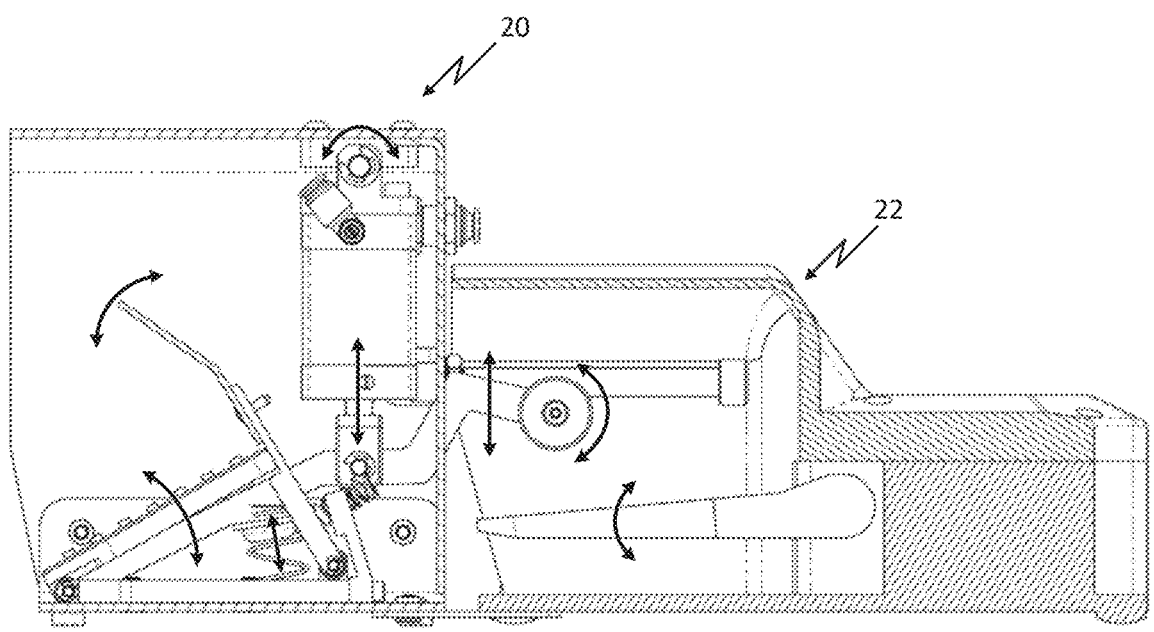
FIG. 2E is a cross-section side view of a technical drawing of an embodiment of the pedal actuator coupled to a pedal control panel showing the degree of freedom of the moving parts.
Figure 2F:
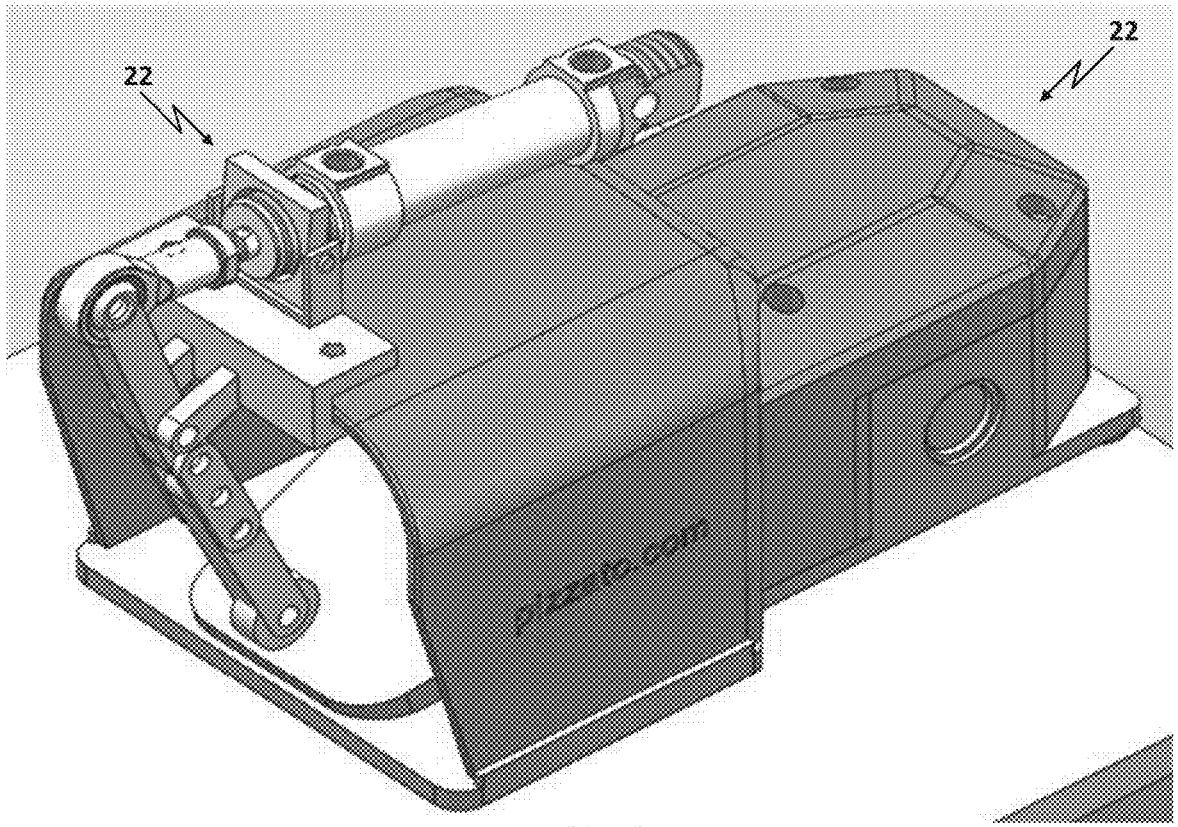
FIG. 2F is a general view of a 3D modelization of an alternative embodiment of a pedal actuator unit.
Figure 2G:
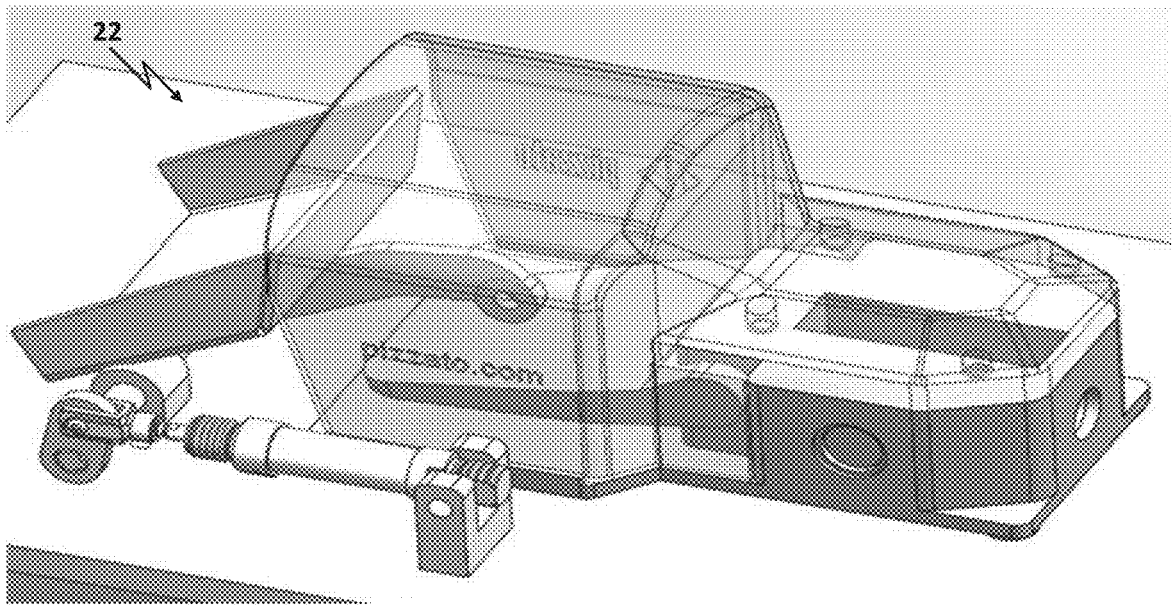
FIG. 2G is a general view of a 3D modelization of an alternative embodiment of a pedal actuator unit.

FIG. 2E is a cross-section side view of a technical drawing of an embodiment of the pedal actuator coupled to a pedal control panel showing some of the degree of freedom of some of the moving parts of an embodiment of the proposed robot interface (i.e., pedal actuator unit).

It will be appreciated that some embodiments of the pedal actuator unit can be equipped with a detector for detecting when an operator interact with the operator-input of the pedal actuator interface. A detector can be integrated to or combined with any of the moving parts of the pedal actuator unit. In some embodiments, the information collected by the detector can be used by the associated robot or cobot as an addition or complementary input date to determine the state of the machine's process, the best next operation to perform, to complement a machine-learning software and other data process that can improve its efficiency.

Push-Button Actuator Unit

Some machinery can be equipped with one or more types of mechanical inputs, which in some cases are a push-button of an interface of the machinery for controlling some aspect of the machinery's process. In such cases, a robot or cobot can utilize a proposed modular non-intrusive push-button actuator unit 30 as an appropriate robot interface to operate the pedal input of the machinery 33, as illustrated in FIGS. 3A and 3B. FIGS. 3D, 3E and 3F present various possible alternative embodiments of the proposed push-button actuator unit.

The problem to be solved with the proposed a push-button actuator unit 30 comprises physically pushing a push-button 33 of an industrial machine that may have a while allowing a human operator to manually push the same push-button 33 while the apparatus is still non-intrusively coupled with the push-button interface of a machinery. The push-button actuator unit can control an actuator 308 to physically operate the mechanical input of the machinery 33. In some embodiments, the operator operates the operator-input 302 of the proposed push-button actuator unit 30 to directly operates the mechanical input of the machinery 33 or to operate it indirectly by controlling the actuator 308 of the push-button actuator unit, which in turn directly operates the mechanical input of the machinery.

This invention was developed to facilitate and allow the integration of automated robots used to replace or use in combination with the operator(s) of an industrial machine(s) having a physical interface comprising at least one push-button 33 used to operate it. The industrial machines considered herein can have various integrated push-button 33. By "integrated push-button" we mean that the activation system of the machine can only be activated with a button, push-button, switch, dimmer switch, analogous actuators or other of the physical interface (i.e., control panel or control interface) of the machinery.

The push-button actuator unit must be compact enough to ensure it does not obstruct neighboring components or controls of the control panel. The push-button actuator unit 30 may be activated with various control systems (e.g., pressured fluid systems). In some embodiments, the push-button actuator unit is designed to overcome various tamper-proof features of the machine's push-button (e.g., button socket 330 surrounding the push-button at least up to the upper/contact surface of the push-button). In some embodiments, the push-button actuator unit can be coupled to the control panel with various coupling mechanism, such as glue, screws, magnets, etc.

Figure 3C:
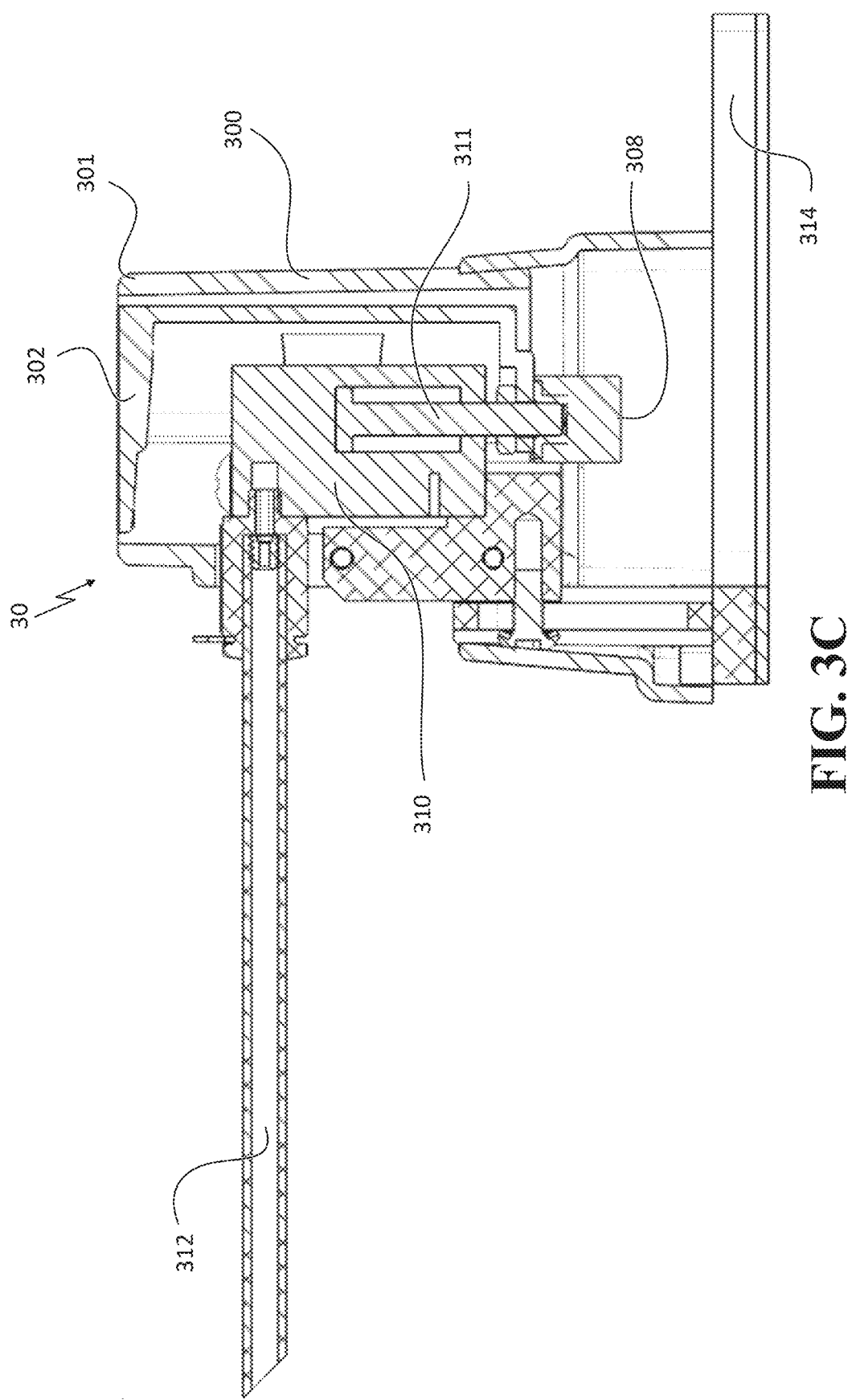
FIG. 3C is a cross-section side view of a technical drawing of the embodiment of a button actuator unit presented in FIG. 3A.
Figure 3F:
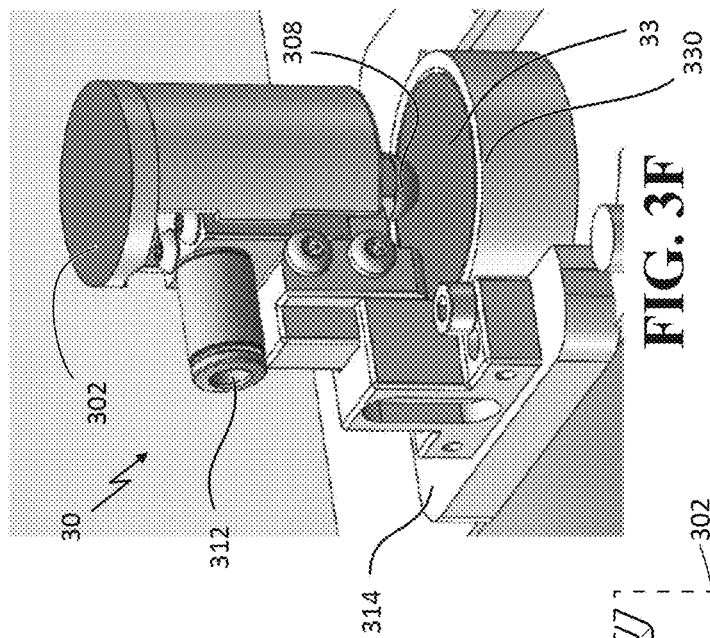
FIGS. 3D, 3E and 3F are various alternative embodiment of a button actuator unit.
Figure 3E:
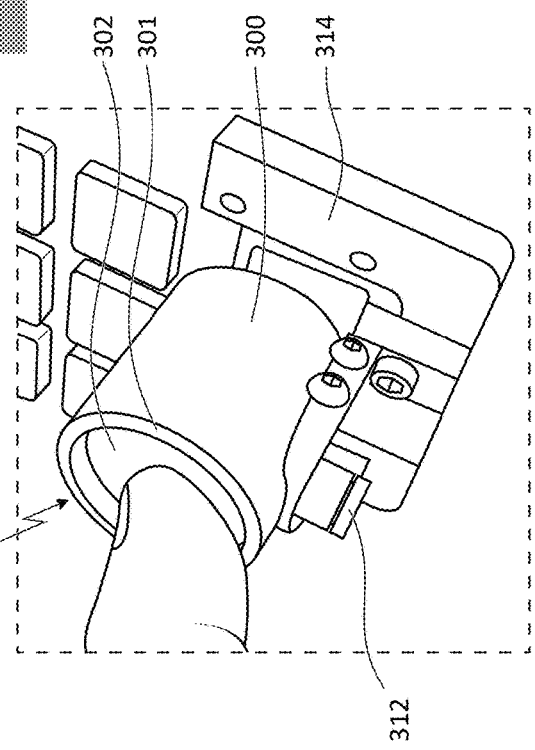
Figure 3D:
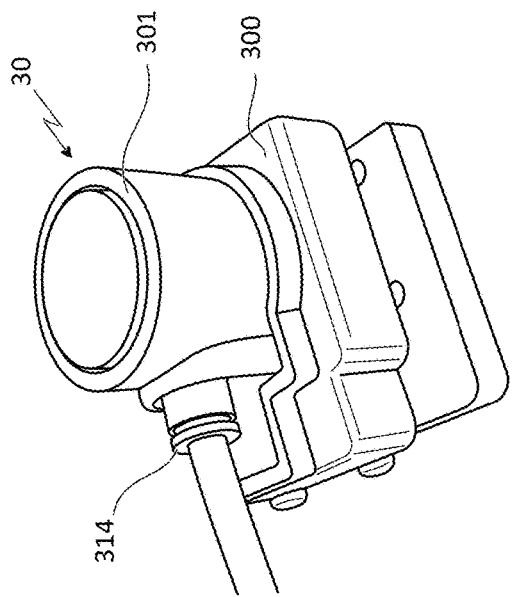

FIG. 3C presents a cross-section side view of a technical drawing of an embodiment of the push-button actuator unit 30 coupled to control panel of the machine's push-button 33. The push-button actuator unit 30 can use an actuator 308 to engage a push-button 33 of the control panel. The push-button actuator unit 30 can be equipped with various types of actuators 308 that can allow to avoid or bypass any tamper-proof component of the machinery's push-button 33 and engage it, that can be a moving piston 311 of a mechanical motion generator 310 in this embodiment. The motion generator component can be one or more hydraulic, pneumatic or mechatronic cylinder(s) or alternatively various types of motors. The mechanical motion generator 310 can be used to convert an input signal (e.g., electrical, fluid pressure, fluid flow, etc.) going through a control signal input 312 input mechanical motion that can result in the motion of a piston 311 which controls the position and motion of an actuator 308, for example. The actuator 308 can be equipped or coupled with a restoring or resetting mechanism that can provide a mechanical resistive and restoring force sufficient enough to move the actuator back to an initial position (i.e., a position that does not engage the machine's push-button 33). The push-button actuator unit can also comprise an operator-input 302 (e.g., the operator's push-button) to allow the operator to, directly or indirectly, engage the mechanical input of the machinery (e.g., the machine's push-button 33). In some embodiments, the push-button actuator unit may comprise a tamper-proof component for the mechanical input of the machinery, which can be a tamper-proof push-button edge that can prevent the mechanical input of the machinery to be moved, operated or engaged involuntarily. In the exemplary embodiment of FIG. 2D, the tamper-proof component may be the surrounding edge 301 of the push-button 302 that can be avoided by an operator and allow him to use the push-button 302. The push-button actuator unit can comprise a housing 300 equipped with a coupler 314 for non-intrusive coupling with the control panel of the machinery around the machinery's push-button 33.

It will be appreciated that some embodiments of the push-button actuator unit can be equipped with a detector for detecting when an operator interact with the operator-input of the push-button actuator interface. A detector can be integrated to or combined with any of the moving parts of the push-button actuator unit. In some embodiments, the information collected by the detector can be used by the associated robot or cobot as an addition or complementary input date to determine the state of the machine's process, the best next operation to perform, to complement a machine-learning software and other data process that can improve its efficiency.

Light Indicator Detector

The problem to be solved with the proposed apparatuses can comprise converting light and visual information/cues output from an industrial machine into an electronic/informatic input for an automated or collaborative robot intended to operate the industrial machine. It will be appreciated that such automated robots cannot properly (automatically) operate machines having closed electronic and informatic systems with such visual cues that are intended to be interpreted and used by a human operator to communicate information relating to the state of the machine or its process (e.g., "ready to start", "step n completed", "problem detected", "hold", "clear area", etc.).

One of the main aspects of the proposed apparatus is that it can allow to convert the visual/optical cue into electronic/informatic information while a human operator can still be able to see and accurately interpret said visual cue, meaning that said apparatus may not significantly obstruct the view of a human operator.

This invention was developed to allow the integration of an automated robot (e.g., mechanical arm) used to replace the operator(s) of the industrial machine(s) that were made with integrated communication systems having at least one visual indicator with features for specifically targeting/communicating with the human operator(s). The industrial machines considered herein can have various integrated indicators for the purpose of communicating information (i.e., about the state of the machine or its process) to the operator(s) such as light indicators, light beacons, screen interfaces or more. The "integrated communication systems" can be a communication system of the machine functioning at least in part internally (within the closed electronic or informatic system of the machine), meaning that some of the information to communicate it cannot be probed, externally connected, extracted, modified or used with other types of external access to measure/relay said information.

In one aspect of the proposed invention, the apparatus is a light-detector that can comprise a photodetector to detect the state of a discreet light beacon or light indicator. In some embodiments, the light-detector can have an electronic circuit or informatic program for interpreting the signal measured with the photodetector if the light indicator is either On, Off, flashing rapidly, flashing slowly, flashing with a specific pattern, etc. In some embodiments, the light-detector can have an adjustable electronic circuit or informatic program for filtering and/or analyzing the signal coming from the photodetector, which can include a lowpass, highpass or bandpass filter for filtering the undesired ambient noise that may be measured (e.g., a different light source then the targeted light indicator such as the ambient lighting of a factory, a light indicator of a neighboring machine, a change of daylight intensity through a window, etc.). In some embodiments, the light-detector can have physical light-filtering system between its photodetector and light indicator, which may be a housing or socket for the photodetector that allows for directionality selection of the measured light signal (to reduce the sensibility to light coming from behind, above, below, etc.), one or more optical filters (e.g., lenses, liquid crystal lens, shortpass, longpass, bandpass wavelength filter) that can help focus on the detection of specific wavelengths (e.g., green, yellow or red light indicators), any other physical light-filtering system, or a combination thereof. In some embodiments, the circuitry for processing a photodetector signal can comprise electronic filtering (e.g., lowpass, highpass, bandpass voltage filter). In some embodiments, the light-detector can be configured to connect with a wide variety of computer devices, including informatic systems of robots (e.g., automated robotic arm, button actuator, pedal actuator, switches, etc.). In some embodiments, the shape of the housing or a coupling adaptor of the light-detector can be shaped as required to fit the shape of the corresponding light indicator (e.g., concave face to match the cylindrical shape of a light indicator). In some embodiments, the light-detector can be modular or can be permanently fixed as required.

Figure 4C:
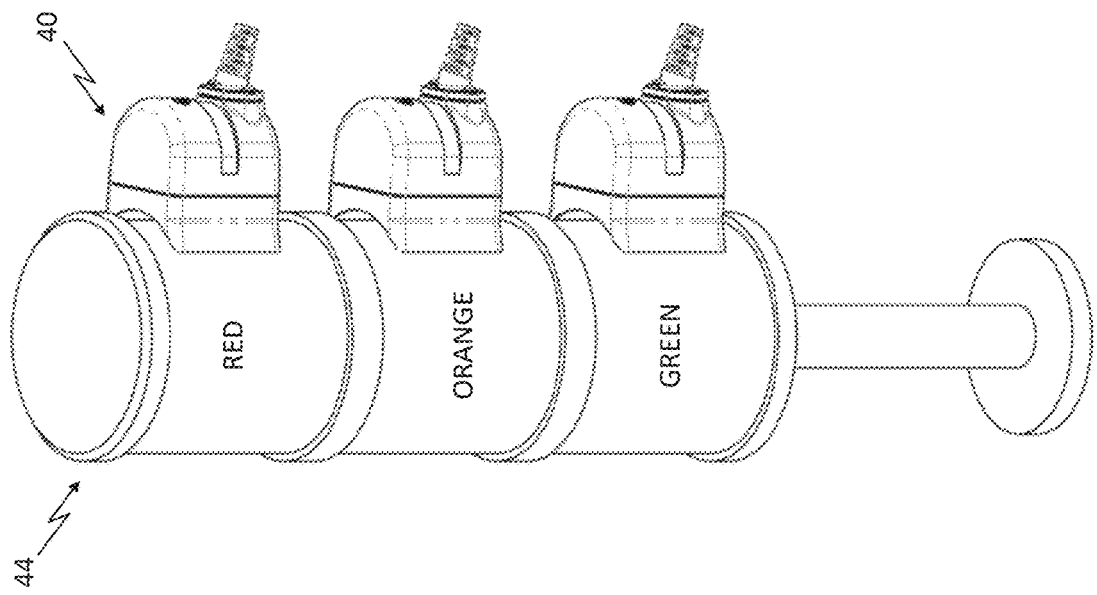
FIG. 4C is a schematic illustration of three of the light sensor unit mounted on a three-color industrial machine light indicator.
Figure 4A:
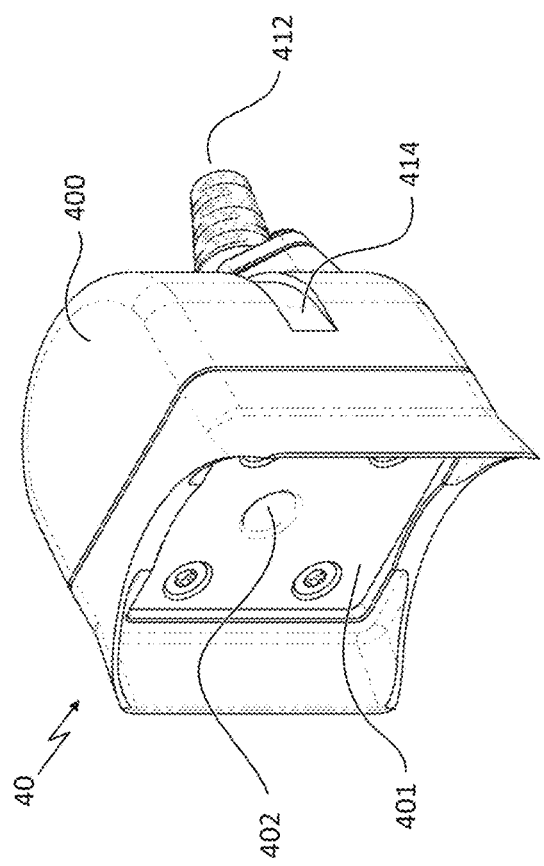
FIG. 4A is a general view of an embodiment of the light sensor unit.
Figure 4B:
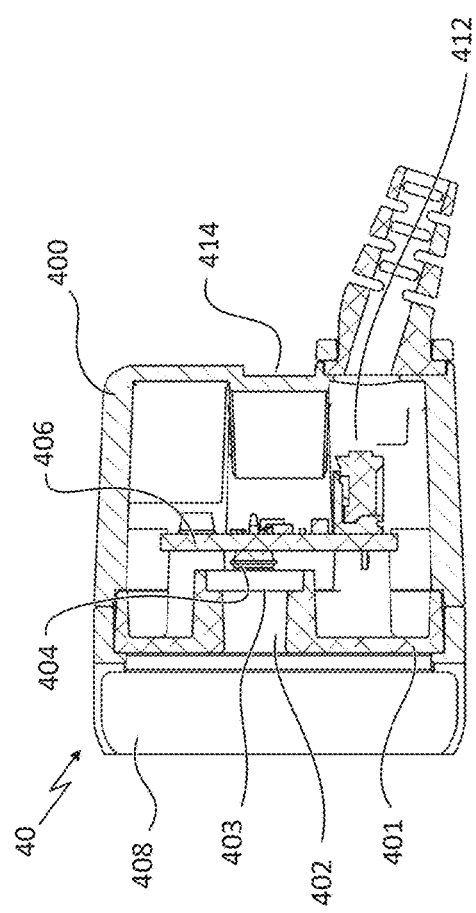
FIG. 4B is a cross-section side view of a technical drawing of the embodiment of a light sensor unit presented in FIG. 4A.

FIG. 4A is a general view of an embodiment of the light sensor unit 40 and FIG. 4B is a cross-section side view of a technical drawing of this embodiment. The light indicator detector 40 can have a housing 400 that can comprise a light signal input opening 402 (e.g., an opening into a cover 401 of the housing), output signal opening 412, a coupling strap notch 414 to secure in place a strap that can be used to securely couple the light sensor detector 40 with the visual output interface 44 of the machine (e.g., stack light), a coupling adaptor 408, or a combination thereof. It will be appreciated that the light signal input opening 402 or the coupling adaptor 408 can help reduce possible light noise by favoring capturing and measuring of the incident light or by reducing the gaps where the ambient light can pass through. In some embodiments, the internal components of the light indicator detector 40 can include an optical component 403 (e.g., light filter, lens, etc.), a light detector 404 (e.g., photodetector, camera, etc.), a circuit board 406, a memory unit, a processor, or a combination thereof.

FIG. 4C presents an assembly comprising the embodiment previously described 40 FIG. 4A coupled to a signal tower stack light 44.

Display Monitoring Camera

Some machinery can be equipped with one or more types of displays. In such cases, the display of the machinery can be used to communicate information as visual output data that can be interpreted by an operator. The following describes an exemplary embodiment of a display monitoring camera for that is configured to monitor this visual output data and can relay it to the cobot as an input.

In another aspect of the proposed invention, the apparatus is a visual interface analyzer that can comprise an image/video camera to capture an image/video of the display interface of an industrial machine to be analyzed and interpreted by an informatic program that can include an algorithm to convert a visual information (e.g., color coded, symbol coded, based on words, based on abbreviation, etc.) to informatic data, information (e.g., for a database or monitoring system or quality control or more) or command for an automated robot. In some embodiments, where the camera is not positioned directly in front of the display (to prevent obstructing the vision of the human operator, for example) or when the display is curved or have any deformation to the displayed image, the camera must be able to correct the image deformations (de-warping) of the taken images(s) to allow for better interpretation of the information displayed by the machine's display. In some embodiments, the camera can be manually or automatically adapted to control the intensity and contrast of the taken image as a function of the luminosity of the entire taken image or area(s) of interest (region of the display where the desired information in known to be displayed, e.g., top-right corner for step #1 followed by a second region that can be the bottom-right corner while waiting or monitoring a following step).

Figure 6:
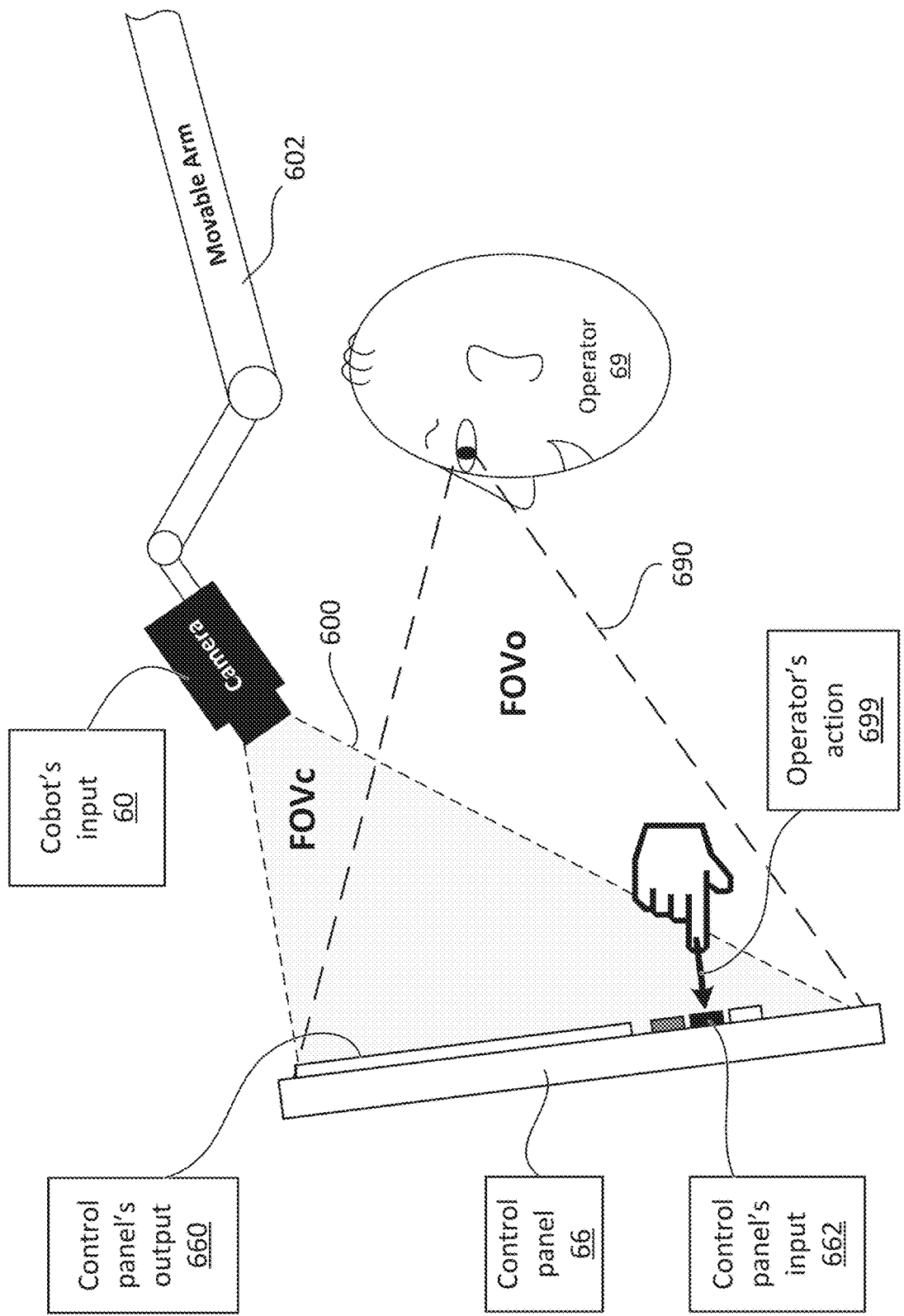
FIG. 6 shows a schematic representation of a camera for monitoring the display interface of a machine.

FIG. 6 presents an embodiment of such a non-intrusive input module for a cobot can be a retractable camera 60 that observes the display screen of an operator interface or of a control panel 66 (e.g., touch screen/display) of a machine as schematized in FIG. 6. The camera 60 can be movable and retractable by means of a support arm 602 that can be an articulated arm. In some embodiment the camera 60 can be manually positioned by an employee or an operator 69 to avoid blocking the view of an operator using the interface 690 (FOVo) and such and that the field of view of the camera 600 (FOVc) covers at least one region of interest of the display screen 660. In some embodiments, a robot or cobot can use a mechanical arm 602 to position the camera 60 to view a region of interest of the display screen 660 to avoid blocking the view of an operator using the interface 690 (FOVo), and optionally to move the camera out of the way. The camera 60 can be mounted on the cobot's arm 602 or can be the cobot's arm camera (as described in U.S. Pat. No. 10,875,187, for example). In some embodiments, the FOVc 600 can be wide enough or the camera can be positioned so that is covers and captures the entirety of the display 660. In some embodiments, the camera also monitors a region surrounding the display and can pickup on an action of an operator 699 (e.g., pushing of a button, flipping of a switch or more). In some embodiments, the camera 60 can further comprise an optical component that can be but is not limited to at least one lens, a liquid crystal lens, a light filtering component (e.g., liquid crystal lens, wavelength filter, etc.), and more. It will be appreciated that the camera 60 may be preferably positioned not only to prevent obstructing FOVo but also to ensure that a moving operator, employee, robot or other does not come in involuntary contact with the camera, by accidentally hitting the camera or bumping into it, for example. In some embodiments, the operator can define templates for trigger areas of specific screens, and the camera software can inform the cobot of the status of the machine from the screen image. In some embodiments, the camera software can analyze images to identify and interpret the nature or the corresponding input activated by an action performed by the operator 699.

Control Unit

Figure 5A:
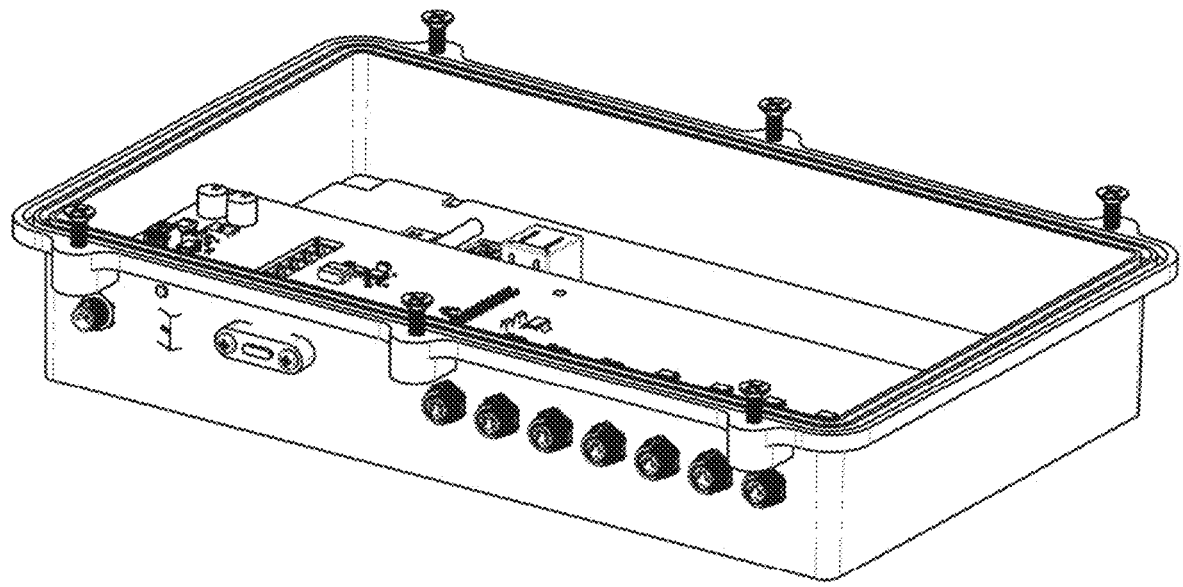
FIG. 5A shows a schematic representation of an open control briefcase.
Figure 5B:
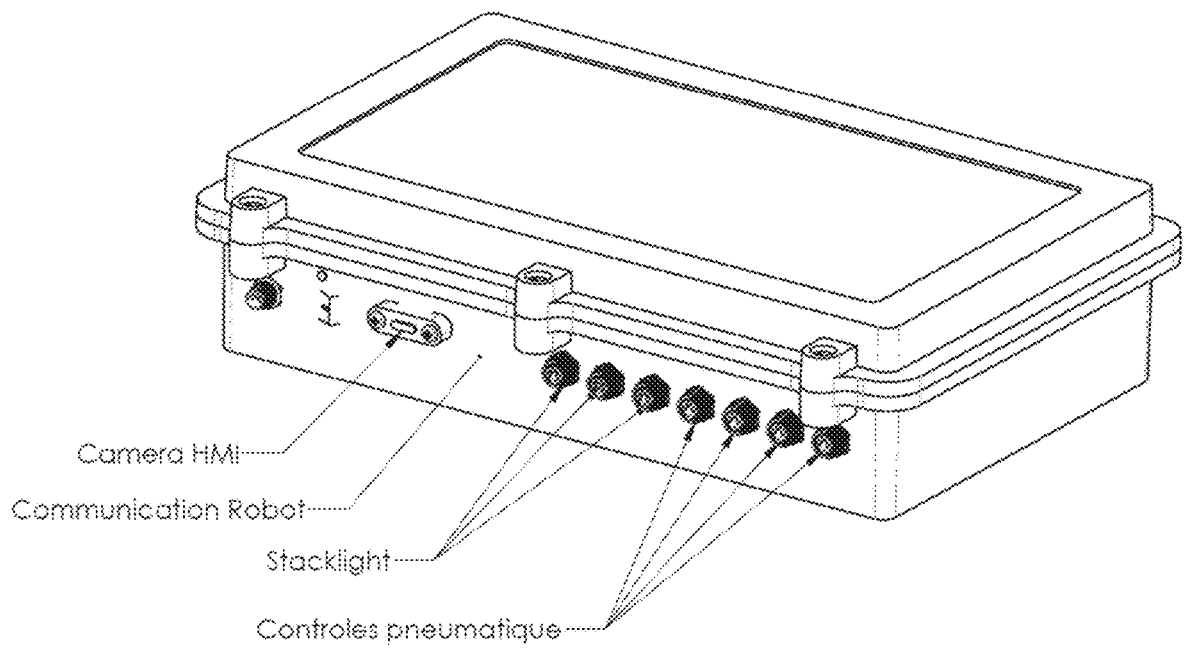
FIG. 5B shows a schematic representation of the control briefcase when closed.

The proposed cobot interfaces can be connected to a control unit. A control unit can be directly implemented within the proposed interfaces described herein or can be a separate unit. A control unit can be directly of indirectly connected to a robot or cobot. In some embodiments, the control unit can be remotely controlled and the data containing instruction or information can be transmitted via remote communication (e.g., Bluetooth, radio, Wi-Fi, or other alternatives). In the examples of FIGS. 5A and 5B, the control unit can be a modular separate unit that is connectable to at least one of the proposed cobot interfaces. In these illustrated embodiments, the control unit can comprise an adapted connector (e.g., camera HMI, communication robot, stack light, pneumatic controls, etc.) that can be used to control (i.e., send control signal to) the proposed operating non-intrusive robotic interface and/or receive data from the proposed visual non-intrusive robotic interface.

What is claimed is:

1. A method of manufacturing a product comprising:
   providing a machinery used in a process of manufacturing said product;
   providing at least one robotic interface compatible with said machinery used in said process of manufacturing said product, wherein said at least one robotic interface comprises one or more of:
   (a) an actuator for physically engaging an input of said machinery;
   a control input for controlling said actuator; and
   an operator-input operable by an operator of said machinery for operating said input of said machinery; and
   (b) an optical detector for detecting visual output of a visual-output-indicator of said machinery and for converting said visual output into an electronic optical data; and
   an output of said at least one robotic interface for transmitting said electronic optical data to a robot, wherein said at least one robotic interface is positioned around said visual-output-indicator so as to allow said operator to observe said visual output of said visual-output-indicator;
   providing said robot able to use said at least one robotic interface;
   installing said at least one robotic interface on said machinery used in said process of manufacturing said product;
   selecting whether said robot or said operator is using said at least one robotic interface or a combination thereof; and
   using said at least one robotic interface installed on said machinery used in said process of manufacturing said product according to said selecting to complete at least one step of said process of making said product.

2. The method of manufacturing the product as defined in claim 1, wherein said operator-input controls said actuator.

3. The method of manufacturing the product as defined in claim 1, wherein said input of said machinery and said operator-input are at least one control pedal.

4. The method of manufacturing the product as defined in claim 1, wherein said input of said machinery and said operator-input are at least one push-button.

5. The method of manufacturing the product as defined in claim 1, wherein said operator-input further comprises a tamper-proof component to prevent unintentional use.

6. The method of manufacturing the product as defined in claim 1, wherein said operator input-actuator of said machinery further comprises a tamper-proof bypass to bypass a tamper-proof feature of said input of said machinery.

7. The method of manufacturing the product as defined in claim 1, wherein said operator input-actuator of said machinery further comprises a tamper-proof disabling component to disable a tamper-proof feature of said input of said machinery.

8. The method of manufacturing the product as defined in claim 1, further comprising a detector for detecting an interaction between said operator and said operator-input.

9. The method of manufacturing the product as defined in claim 8, wherein said detecting comprises generating data comprising details about said interaction and transmitting said data to said robot through said output.

10. The method of manufacturing the product as defined in claim 1, wherein said robotic interface further comprises a housing for coupling to said visual-output-indicator, wherein said housing allows for said detecting of said visual output.

11. The method of manufacturing the product as defined in claim 10, wherein one face of said housing allows for said detecting of said visual output and is shaped to match a shape of said visual-output-indicator for improving said coupling to said visual-output-indicator and reducing optical interference.

12. The method of manufacturing the product as defined in claim 1, wherein said visual-output-indicator is a display and/or touch screen.

13. The method of manufacturing the product as defined in claim 1, wherein said optical detector further detects an interaction between said operator and said machinery, wherein details of said interaction are comprised in said electronic optical data.

14. The method of manufacturing the product as defined in claim 1, wherein said at least one robotic interface comprises a control unit for controlling said control input.

15. The method of manufacturing the product as defined in claim 1, wherein said output of said at least one robotic interface is connected to said input of a relay unit, wherein said relay unit remotely does said transmitting to said robot.

16. The method of manufacturing the product as defined in claim 1, wherein said robot is a collaborative robot performing an alternative task in combination with said machinery used in said process of manufacturing said product.

17. The method of manufacturing the product as defined in claim 16, wherein said alternative task comprises using a robotic arm to operate said machinery used in said process of manufacturing said product.

* * * * *